(12) United States Patent
Ueda

(10) Patent No.: US 7,478,052 B2
(45) Date of Patent: Jan. 13, 2009

(54) CONTENTS MARKET RESEARCH SYSTEM, CONTENTS MARKET RESEARCH APPARATUS, CONTENTS POLLING APPARATUS, CONTENTS MARKET RESEARCH METHOD, AND RECORDING MEDIUM

(75) Inventor: Satoru Ueda, Kanagawa (JP)

(73) Assignees: Sony Corporation, Tokyo (JP); Sony Chemicals Corporation, Tokyo (JP)

( * ) Notice: Subject to any disclaimer, the term of this patent is extended or adjusted under 35 U.S.C. 154(b) by 862 days.

(21) Appl. No.: 09/819,264

(22) Filed: Mar. 28, 2001

(65) Prior Publication Data

US 2001/0027410 A1 Oct. 4, 2001

(30) Foreign Application Priority Data

Mar. 30, 2000 (JP) ............................ P2000-094282

(51) Int. Cl.
G06F 17/30 (2006.01)
(52) U.S. Cl. ....................................................... 705/10
(58) Field of Classification Search .................. 705/10, 705/12
See application file for complete search history.

(56) References Cited

U.S. PATENT DOCUMENTS

| | | | | |
|---|---|---|---|---|
| 5,400,248 | A * | 3/1995 | Chisholm | 705/12 |
| 5,526,257 | A * | 6/1996 | Lerner | 705/10 |
| 6,236,975 | B1 * | 5/2001 | Boe et al. | 705/7 |
| 6,529,878 | B2 * | 3/2003 | De Rafael et al. | 705/14 |
| 2001/0032115 | A1 * | 10/2001 | Goldstein | 705/10 |
| 2002/0002482 | A1 * | 1/2002 | Thomas | 705/10 |
| 2003/0216956 | A1 * | 11/2003 | Smith et al. | 705/10 |

OTHER PUBLICATIONS

Video Week, Video notes, May 22, 1995, v.16, n.20 [Dialog file 636: Gale Group Newsletter database].*
Hagel, Who will benefit from virtual information, Summer 1996, The McKinsey Quarterly, v.1996, n.3, p. 23-37.*
Patent Abstracts of Japan, JP08163538A2, [online], [retrieved Mar. 7, 2005 via URL: <http://www.delphion.com/cgi-bin/viewpat.cmd/JP08163538A2>] (2 pages).*
Patent Abstracts of Japan, JP09171504A2, [online], [retrieved Mar. 7, 2005 via URL: <http://www.delphion.com/cgi-bin/viewpat.cmd/JP09171504A2>] (2 pages).*

(Continued)

Primary Examiner—Jeffrey A. Smith
Assistant Examiner—Kalyan Deshpande
(74) Attorney, Agent, or Firm—Frommer Lawrence & Haug LLP; William S. Frommer; Thomas F. Presson

(57) ABSTRACT

A system and method that reduces content selection cost, to commercialize the proper picture content quickly, and to reduce the cost required to research the detailed sales market. Content introduction information is sent to a contents polling apparatus, the content introduction information is displayed at a contents introduction information display. A pollee views the displayed content introduction information and enters the contents polling information for each picture content, the entered contents polling information is sent to a contents market research apparatus, which counts the sent contents polling information and generates a counted result as the output.

11 Claims, 7 Drawing Sheets

OTHER PUBLICATIONS

Patent Abstracts of Japan, JP09175504A2, [online], [retrieved Mar. 7, 2005 via URL: <http://www.delphion.com/details?pn=JP09175504A2>] (2 pages).*

Patent Abstracts of Japan, JP10093950A2, [online], [retrieved Mar. 7, 2005 via URL: ,http://www.delphion.com/cgi-bin/viewpat.cmd/JP10093950A2>] (2 pages).*

* cited by examiner

FIG.2

ADVERTISEMENT SUBJECT: DREAMING CATS

NAME:NECESSARY
ADDRESS:NECESSARY
PEN NAME:
TITLE:
MESSAGE:

KEY WORD: ⊙DREAM ●NAP ⊙LOVE ⊙REPOSE ⊙FIGHT
⊙OTHERS

INQUIRY ABOUT COPYRIGHT:NECESSARY
⊙DOES SUBSCRIBED WORK INCLUDE ANY WORK OF OTHER ARTISTS ?
⊙ I HAVE PERMISSION FROM COPYRIGHT HOLDER
⊙ I DO NOT HAVE PERMISSION FROM COPYRIGHT HOLDER
● SUBSCRIBED WORK DOES NOT INCLUDE ANY WORK OF OTHER ARTISTS

26 → DO YOU AGREE WITH SUBSCRIPTION RULE?
● YES ⊙ NO     READ SUBSCRIPTION RULE ~25

DRAG AND DROP PRESENTING STILL PICTURE SAMPLE FILE HERE

DRAG AND DROP PRESENTING MOVING PICTURE SAMPLE FILE HERE

27~ SEND
28~ CLEAR 20, 21, 22, 23, 24

FIG.3

ADVERTISEMENT SUBJECT:ADVERTISEMENT TERM:UNTIL SEPTEMBER 1,2000    DREMING CATS
DVD COMPLETION SCHEDULE : ON SALE OCTOBER 1,2000

YOU CAN VIEW INTRODUCTION VIDEO BY CLICKING ICON

 <CA51>ARTIST:NEKOTA KOKICHI    TITLE:CAT IN THE EARLY AFTERNOON
COMMENT OF ARTIST
                                    CURRENT NUMBER OF VOTES 25501
VIDEO WORK                                           WANT TO VIEW IT ～31

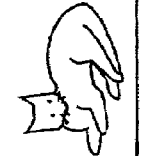 <CA03>ARTIST:SUKINEKO SACHIKO    TITLE:CAT EYE
COMMENT OF ARTIST
                                    CURRENT NUMBER OF VOTES 13501
VIDEO WORK                                           WANT TO VIEW IT ～32

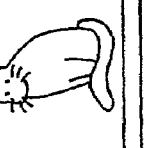 <CA24>ARTIST:TEZUKA NEKOKICHI    TITLE:AFFECTED CAT
COMMENT OF ARTIST
                                    CURRENT NUMBER OF VOTES 13002
VIDEO WORK                                           WANT TO VIEW IT ～33

 <CA16>ARTIST:CATTY SEEN    TITLE:CAT WALKING
COMMENT OF ARTIST
                                    CURRENT NUMBER OF VOTES 2302
ANIMATION                                            WANT TO VIEW IT ～34

30

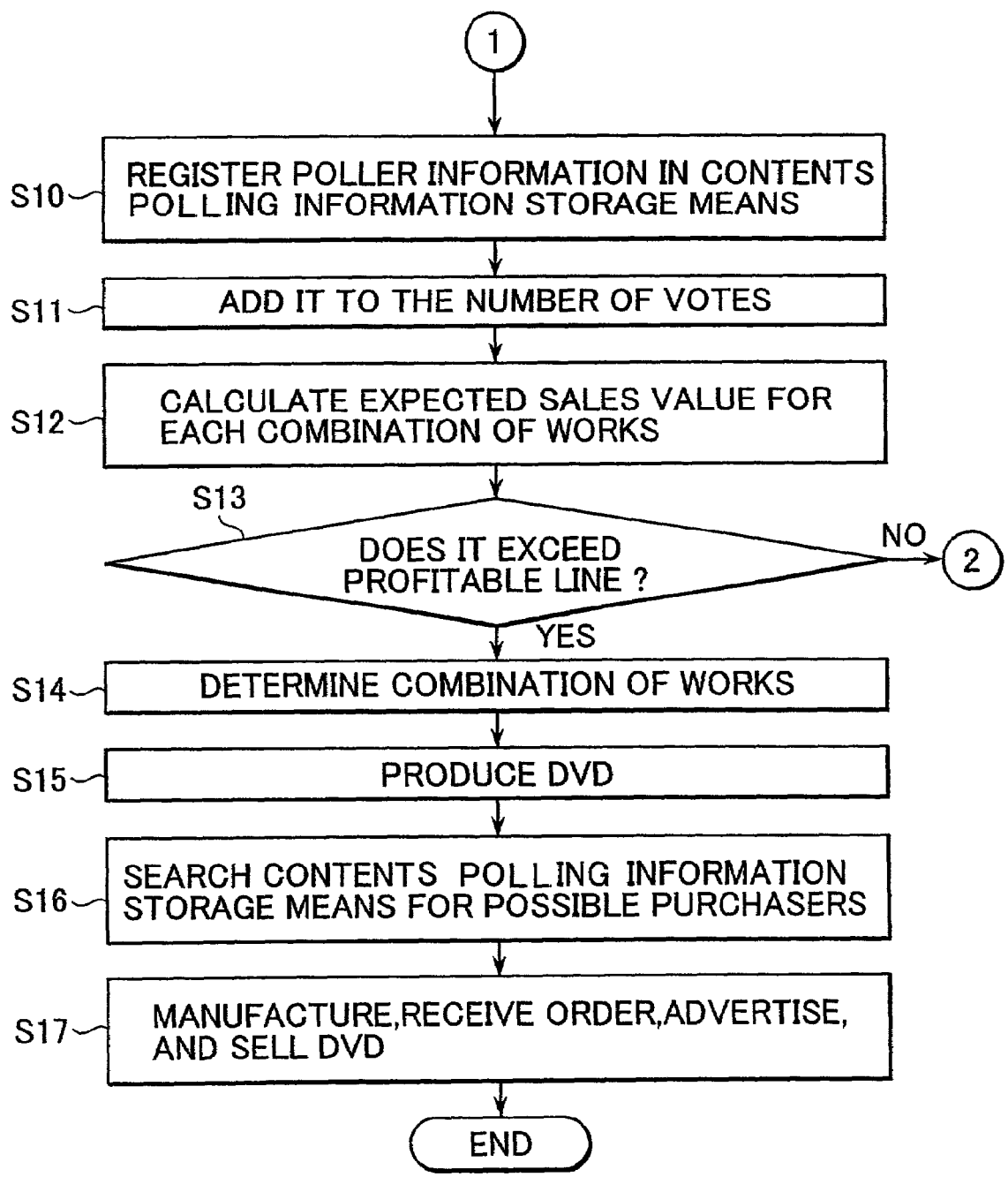

CONTENTS MARKET RESEARCH SYSTEM, CONTENTS MARKET RESEARCH APPARATUS, CONTENTS POLLING APPARATUS, CONTENTS MARKET RESEARCH METHOD, AND RECORDING MEDIUM

BACKGROUND OF THE INVENTION

1. Field of the Invention

This invention relates to a contents market research system, a contents market research apparatus, a contents polling apparatus, a contents market research method that are used for contents market research, and a computer-readable recording medium that stores a program to be executed by use of a computer to perform the contents market research. More particularly, this invention relates to a contents market research system, a contents market research apparatus, a contents polling apparatus, a contents market research method that are used for market research of a picture content before commercialization, and a computer-readable recording medium that stores a program to be executed by use of a computer to perform the market research of a picture content before commercialization.

2. Description of the Related Art

Recently, with popularization of home digital video cameras and image editing apparatus or the like, anyone can take a high quality picture and edit it easily. Some picture content taken as described hereinabove are sufficiently usable commercially as movies, and it is expected that a contents creating company, who commercializes content, commercializes such picture content.

When the picture content is commercialized, it is desirable to grasp the market trend such as propensity of consumers, age group to be targeted, and timing in order to select the correct picture content that reflects the market trend. Heretofore, it has been usual for selecting the picture content to be commercialized that the selection is relied on a planning company, who is an expert in a field such as movie or television program. The planning company who received a request selects a picture content that is supposed to fit to the market trend based on the market research skill and experience, and the content producing company selects the picture content to be commercialized according to the judgment of the planning company, stores the selected picture content in a recording medium such as DVD or the like, and sells the recording medium or distributes the picture content with charge through the Internet.

As a method for grasping the market trend exactly as described hereinabove, for example, Japanese Published Unexamined Patent Application No. Hei 8-163538 is proposed for the case of digital television broadcast, in which the audience rating of a broadcasted program is returned through a telephone line in the form of the data that indicates the number of tuning times of a receiving apparatus, and the data is used for reference in preparation of the broadcast program in future. Furthermore, Japanese Published Unexamined Patent Application No. Hei 10-93950 discloses a method in which an audience who has gained the impression from a program among broadcasted programs polls a ballot for the program through a telephone line to form the data in the broadcast station, and the data is used for preparation of the program in future. However, in these methods, the comment of an audience on a commercialized picture content that has been delivered to the audience is collected for reflecting the comment in preparation of the program in future, but the comment of an audience on a picture content that is not yet commercialized is not collected.

Another example is described herein under. Japanese Published Unexamined Patent Application No. Hei 9-175504 proposes a method in which there is a membership group to which an artist can present the work on the Internet, the presented work is ranked based on the polling by audiences, and other audiences purchase the work with reference to the ranking. However, also in this case, the work that has been already commercialized is ranked based on polling, the rank is opened, and the opened work is sold. Therefore, it is not the case that the work that is not yet commercialized is presented. This method does not suggest whether the work that is not yet commercialized and only in planning will be a great hit or not, and does not indicate the commercial profitability of the business.

It is a problem that the commitment for selection of the picture content to the above-mentioned planning company or the like costs high.

It is another problem that the survey for selection takes a long time and the picture content cannot be commercialized promptly in the case of commitment for selection of the picture content to the above-mentioned planning company or the like.

Furthermore, it is another problem that whether the picture content is selected by the planning company exactly or not depends on the capability in market research and information collection, experience, and the talent of the personnel, and it is not easy to find a planning company who is suitable and skilled in the picture content field.

Furthermore, particularly in the recently years when the consumer preference changes quickly, the marketability of the picture content selected by the planning company can change in a short time, it is a problem that a suitable picture content cannot be commercialized in this case.

Furthermore, in the case of conventional methods, the detailed marketability of the picture content should be surveyed after commercialization separately from the selection of the picture content, and it is another problem that the additional survey costs high.

In the case of the above-mentioned Japanese Published Unexamined Patent Application No. Hei 10-93950, Japanese Published Unexamined Patent Application No. Hei 8-163538, and Japanese Published Unexamined Patent Application No. Hei 9-171504, the business profitability of the work cannot be estimated accurately before the work is commercialized.

SUMMARY OF THE INVENTION

The present invention has been accomplished in view of the above-mentioned problems, it is an object of the present invention to provide a contents market research system that brings about the low content selection cost, the prompt commercialization of a suitable content, and the low cost required for detailed marketability research.

It is another object of the present invention to provide a contents market research apparatus that brings about the low content selection cost, the prompt commercialization of a suitable content, and the low cost required for detailed marketability research.

Furthermore, it is another object of the present invention to provide a contents polling apparatus that brings about the low content selection cost, the prompt commercialization of a suitable content, and the low cost required for detailed marketability research.

Furthermore, it is another object of the present invention to provide a contents market research method that brings about the low content selection cost, the prompt commercialization of a suitable content, and the low cost required for detailed marketability research.

Furthermore, it is another object of the present invention to provide a computer-readable recording medium that stores a program to be executed by means of a computer that functions to bring about the low content selection cost, the prompt commercialization of a suitable content, and the low cost required for detailed marketability research.

To solve the above-mentioned problem, the present invention provides a contents market research system for researching the marketability of a picture content before commercialization based on the polling information given by the pollee and for displaying the result on a display apparatus comprising a contents market research apparatus having a contents introduction information storage means that stores the content introduction information for introducing the picture content to the pollee, a contents introduction information storage means that stores the content introduction information for introducing the picture content to the pollee, a contents introduction information sending means for sending the content introduction information stored in the contents introduction information storage means, a contents polling information receiving means for receiving the contents polling information that is the polling information for the picture content, a contents polling information storage means for storing the contents polling information received by means of the contents polling information receiving means, a poll result counting means for discriminately counting the contents polling information stored in the contents polling information storage means between the contents polling information entered by the predetermined pollee and the contents polling information entered by the general pollee and for displaying the business profitability to be obtained when the content is commercialized on the display apparatus, and a contents polling apparatus having a contents introduction information receiving means for receiving the content introduction information sent by means of the contents introduction information sending means, a contents introduction information display means for displaying the content introduction information received by means of the contents introduction information receiving means, a contents polling means used for entering the contents polling information, and a contents polling information sending means for sending the contents polling information entered by means of the contents polling means.

Herein, the contents introduction information storage means stores the content introduction information, the contents introduction information sending means sends the content introduction information stored in the contents introduction information storage means, the contents introduction information receiving means receives the content introduction information sent by means of the contents introduction information sending means, the contents introduction information display means displays the content introduction information received by means of the contents introduction information receiving means, the contents polling information is inputted to the contents polling means, the contents polling information sending means sends the contents polling information inputted by the contents polling means, the contents polling information receiving means receives the contents polling information, the contents polling information storage means stores the contents polling information received by the contents polling information receiving means, and the poll result counting means counts the contents polling information stored in the contents polling information storage means and displays the business profitability of the content on the display apparatus.

The present invention provides a contents market research apparatus for researching the marketability of a picture content before commercialization based on the polling information given by the pollee comprising a contents market research apparatus having a contents introduction information storage means that stores the content introduction information for introducing the picture content to the pollee, a contents introduction information storage means that stores the content introduction information for introducing the picture content to the pollee, a contents introduction information sending means for sending the content introduction information stored in the contents introduction information storage means, a contents polling information receiving means for receiving the contents polling information that is the polling information for the picture content, a contents polling information storage means for storing the contents polling information received by means of the contents polling information receiving means, a poll result counting means for discriminately counting the contents polling information stored in the contents polling information storage means between the contents polling information entered by the predetermined pollee and the contents polling information entered by the general pollee and for displaying the business profitability to be obtained when the content is commercialized as described hereinabove on display means.

Herein, the contents introduction information storage means stores the content introduction information, the contents introduction information sending means sends the content introduction information stored in the contents introduction information storage means, the contents polling information receiving means receives the contents polling information that is the polling information for the picture content, the contents polling information storage means stores the contents polling information received by means of the contents polling information receiving means, and the poll result counting means counts the contents polling information stored in the contents polling information storage means and displays the business profitability of the content.

Furthermore, the present invention provides a contents polling apparatus used to poll for a picture content before commercialization, having a contents introduction information receiving means for receiving the content introduction information sent by means of the contents introduction information sending means, a contents introduction information display means for displaying the content introduction information received by means of the contents introduction information receiving means, a contents polling means used for entering the contents polling information, and a contents polling information sending means for sending the contents polling information entered by means of the contents polling means.

Herein, the contents introduction information receiving means receives the sent content introduction information, the contents introduction information display means displays the content introduction information received by means of the contents introduction information receiving means, the contents polling means is used to enter the contents polling information, and the contents polling information sending means sends the contents polling information entered by means of the contents polling means.

Furthermore, the present invention provides a contents market research method used for researching the marketability of a picture content before commercialization based on the polling information given by the pollee in which the content introduction information for introducing the picture content to the pollee is stored, the stored content introduction information is sent to the pollee, the contents polling information that is the polling information for the content is received from the pollee, the received contents polling information is stored, the stored contents polling information is discriminately counted between the contents polling information entered by the predetermined pollee and the contents polling information entered by the general pollee, and the business profitability to be obtained when the content is commercialized is determined.

As the result of the above-mentioned method, the picture content of high commercial value is selected easily.

Furthermore, the present invention provides a computer-readable information recording medium that is an information recording medium used for a contents market research apparatus that researches the marketability of a picture content before commercialization based on the polling information given by the pollee having a recorded program for implementing a sequential processing in which the content introduction information for introducing the picture content to the pollee is stored, the stored content introduction information is sent to the pollee, the contents polling information that is the polling information for the content is received from the pollee, the received contents polling information is stored, the stored contents polling information is discriminately counted between the contents polling information entered by the predetermined pollee and the contents polling information entered by the general pollee, and the business profitability to be obtained when the content is commercialized is determined.

Furthermore, the present invention provides a computer-readable recording medium having a recorded program implemented on a computer for receiving the sent content introduction information, displaying the received content introduction information, entering the contents polling information, and transmitting the entered contents polling information.

BRIEF DESCRIPTION OF THE DRAWINGS

FIG. 2 is a diagram illustrating a display example of a content subscribing graphical user interface (GUI) picture used when the picture content is subscribed by use of the Internet.

FIG. 3 is a diagram illustrating a display example of a contents polling graphical user interface (GUI) picture displayed for polling.

FIG. 4 is a diagram illustrating a display example of a polling information input graphical user interface (GUI) picture.

FIG. 7 is a flow chart describing a series of operations operated when the system of the present invention is used.

DETAILED DESCRIPTION OF THE PREFERRED EMBODIMENTS

Embodiments of the present invention will be described hereinafter with reference to the drawings.

Figure 1:
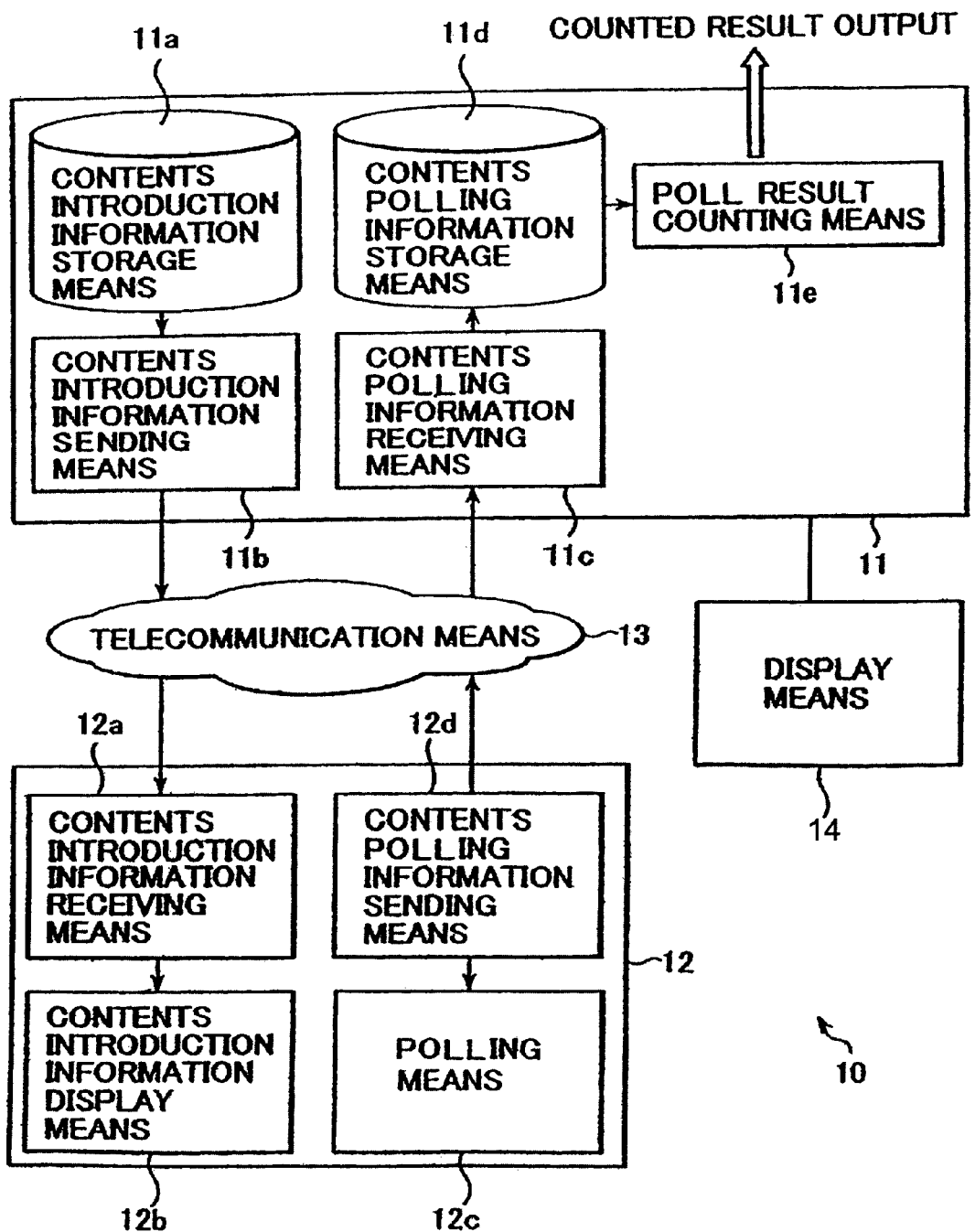
FIG. 1 is a structural diagram illustrating the structure of a contents market research system.

FIG. 1 is a structural diagram illustrating the structure of a contents market research system 10 of the present invention.

The contents market research system 10 for being used to introduce the picture content that is not yet commercialized to consumers comprises a contents market research apparatus 11 for searching the marketability of the picture content, a contents polling apparatus 12 that is used for polling by consumers to whom the content has been introduced, telecommunication means 13 such as the Internet for information transmission between the contents market research apparatus 11 and the contents polling apparatus 12 and a display 14 for displaying information, such as business profitability.

The contents market research apparatus 11 comprises a contents introduction information storage means 11a for storing the content introduction information, a contents introduction information sending means 11b for sending the content introduction information stored in the contents introduction information storage means 11a, a contents polling information receiving means 11c for receiving the contents polling information that is the polling information of the picture content, a contents polling information storage means 11d for storing the contents polling information received by means of the contents polling information receiving means 11c, and a poll result counting means 11e for counting the contents polling information stored in the contents polling information storage means 11d.

The contents polling apparatus 12 comprises a contents introduction information receiving means 12a for receiving the content introduction information sent by means of the contents introduction information sending means 11b, a contents introduction information display means 12b for displaying the content introduction information received by means of the contents introduction information receiving means 12a, a contents polling means 12c for entering the contents polling information, and a contents polling information sending means 12d for sending the contents polling information entered by means of the contents polling means 12c. Only one contents polling apparatus 12 is shown in FIG. 1 for the purpose of simplification herein, but a plurality of contents polling apparatuses may be connected to the telecommunication means 13, or in the case that a personal computer is used as the contents polling apparatus 12, a contents polling apparatus 12 may be installed in the home of a consumer who is a pollee.

Next, the operation of the contents market research system 10 will be described with reference to FIG. 1. At first, the content introduction information for introducing a picture content to be subjected to market research is prepared for each picture content, and stored in the contents introduction information storage means 11a. The content introduction information may be prepared by the picture content producer itself or by a producing company who commercializes the picture content collectively. The content introduction information may be a picture clip or the like that is prepared by extracting a part of the picture content or may be a picture clip or the like to which a comment of the producer is added. Otherwise, the content introduction information includes only the comment of the producer. The prepared content introduction information that is stored in a recording medium such as DVD or the like may be distributed by post, or the prepared content introduction information may be distributed by use of a telecommunication means such as the Internet.

The content introduction information is stored, and the content introduction information stored in the contents introduction information storage means 11a is then opened to the public. The content introduction information is opened to the public by transmitting the content introduction information stored in the contents introduction information storage means 11a to the contents polling apparatus 12 through the telecommunication means 13 by use of the contents introduction information sending means 11b. Herein, all the content introduction information stored in the contents introduction information storage means 11a may be sent collectively to all the contents polling apparatuses 12, or the content introduction information is classified into subdivisions separately for each subject of the picture content and the content introduction information that has been classified into subdivisions separately for each subject may be sent collectively to all the contents polling apparatuses 12. Furthermore, the content introduction information that has been classified into subdivisions separately for each subject may be sent only to contents polling apparatuses 12 of consumers who are suitable for each subject.

The content introduction information received by means of the contents polling apparatus 12 is received by means of the contents introduction information receiving means 12a, and the content introduction information received by means of the contents introduction information receiving means 12a is displayed by means of the contents introduction information display means 12b successively.

The content introduction information displayed by means of the contents introduction information display means 12b is viewed by consumers or the like, and consumers or the like who have viewed the content introduction information poll to indicate whether the consumer is favorable to the picture content or not, or whether the consumer wants to buy the picture content or not. In the polling, one consumer may have one ballot evenly, one consumer may have a plurality of ballots evenly, or one expert in the field or one sponsor may have more ballots than one consumer.

A popular polling input on the picture content is entered by means of the contents polling means 12c, and the popular polling information entered by means of the contents polling means 12c is sent from the contents polling information sending means 12d as the contents polling information. When the popular polling input is entered, the personal information such as the age, sex, purchasability, or purchasing power, and e-mail address of the pollee who was polled may be also entered simultaneously. In this case, the entered personal information is sent from the contents polling information sending means 12d as a part of the contents polling information. The contents polling information sent from the contents polling information sending means 12d is sent to the contents market research apparatus 11 through the telecommunication means 13, and received by means of the contents polling information receiving means 11c.

The contents polling information received by means of the contents polling information receiving means 11c is stored in the contents polling information storage means 11d successively, and the poll result counting means 11e counts the contents polling information stored in the contents polling information storage means 11d. For counting of the contents polling information, the number of ballots to each picture content indicated based on the contents polling information is added, and it is possible to calculate the popularity of each picture content. Otherwise, when the contents polling information is counted, the contents polling information entered by special pollee such as experts in the field or sponsors may be counted separately from the contents polling information entered by the general pollee.

The counted result counted by means of the poll result counting means 11e as described hereinabove is an index that indicates the most marketable picture content, and the producing company selects a picture content to be commercialized based on the result. In the case that the personal information of the pollee is entered in polling and the personal information of the pollee is included in the contents polling information, it is possible to count the personal information of the pollee can be counted in addition to the number of ballots to each picture content, and the detailed marketable field of a picture content can be specified based on the counted result of the personal information. Furthermore, it is possible to conduct the advertising activity and selling activity directly to each pollee itself by use of the personal information of the pollee.

Next, the detailed operation of the contents market research system 10 will be described. A content producing company who wants to commercialize a picture content by use of the subscribed picture content determines the advertisement subject of the picture content to be advertised and profitable line to be applied when the picture content is to be commercialized. Next, the content producing company advertises for the picture content according to the determined advertisement subject in television, journals, and Internet widely and generally. A general viewer who is aware of the advertisement and wants to subscribe for the picture content sends the picture content prepared by the subscriber itself to the content producing company by means of a predetermined method. In sending the picture content, a prepared picture content is recorded in a recording medium such as a DVD or videotape and the recording medium is posted to the content producing company, or the prepared picture content may be sent to the content producing company by use of the telecommunication means such as the Internet or the like.

FIG. 2 is a display example of a content subscription graphical user interface (referred to herein as GUI) picture 20 used when a picture content is subscribed by use of the Internet. The content subscription GUI picture 20 is composed of a still picture location part 21 on which a presentation still picture sample file of a picture content to be subscribed is located, a video location part 22 on which a presentation video sample file of a picture content to be subscribed is located, a content information input part 23 on which the information of the picture content to be subscribed is entered, a copyright information input part 24 on which the information concerning the copyright of the picture content to be subscribed is entered, a subscription rule display button 25 for displaying a subscription rule, a subscription rule agreement column 26 on which the agreement on the subscription rule is entered, a transmission button 27 used for indicating to transmit the entered information, and a clear button 28 for deleting the input content on the content subscription GUI picture 20.

A picture content producer who wants to subscribe a picture content by use of the Internet pastes a presentation still picture sample and a presentation video sample that are to be the content introduction information on the still picture location part 21 and the video location part 22 respectively. Any one of a presentation sill picture sample and a presentation video sample may be pasted, or both samples may be pasted. Furthermore, no sample may be pasted.

Next, the subscriber enters the information concerning the prepared picture content on the content information input part 23. The information entered herein includes the name, address, pen-name, title of the prepared picture content, message of the producer, and related key word of the prepared picture content, and the name and address of the producer must be entered without exception.

Next, the subscriber enters the information concerning the copyright of the prepared picture content on the copyright information input part 24. The information that is entered herein includes the information for indicating whether the subscribed picture content includes the works of another person or not, and the information for indicating whether the copyright holder grants a permission or not. The information is entered when the subscriber clicks options corresponding to respective items.

The subscriber clicks the subscription rule display button 25 for seeing the subscription rule to be displayed in which contract terms concerning the picture content subscription is described and views the content of the subscription rule. If the subscriber agrees on the content of the subscription rule, the subscriber clicks "YES" column in the subscription rule agreement column 26. Thereby, the subscriber is regarded as a subscriber who agrees on the displayed subscription rule.

The subscriber completes the input to all the input items, and then clicks the transmission button 27. Thereby, the content entered on the content subscription GUI picture 20 is sent to the producing company through the Internet.

Picture contents sent to the content producing company by means of various ways are subjected to determination to determine whether the content is open to the public or not, and the content introduction information of picture contents that are determined to be opened are stored in the contents introduction information storage means 11a.

At first, the polling numerical value for indicating the number of ballots polled for each picture content is given to the content introduction information stored in the contents introduction information storage means 11a. Because the number of ballots polled for each picture content is generally 0 before polling, at first the number of ballots polled for the picture content is reset to 0. In the case that specified authorities have already polled for the predetermined picture content, the number of ballots is added to the number of ballots polled for the picture content.

After completion of the initial setting of the number of ballots, the content introduction information stored in the contents introduction information storage means 11a is opened to the public. For public opening of the content introduction information, the content introduction information is opened on the Internet by use of the contents introduction information sending means 11b. The content introduction information opened on the Internet is viewed by general public users of the Internet, and the general users who have viewed the content introduction information poll their ballots for the picture content by use of the Internet.

FIG. 3 is a diagram illustrating a display example of a contents polling GUI picture 30 displayed for polling. On the contents polling GUI picture 30, the content introduction information, title, and producer name are displayed, and a plurality of polling buttons 31 to 34 corresponding to the displayed content introduction information are displayed simultaneously. A general user who has viewed the content introduction information clicks one of polling buttons 31 to 34 corresponding to the favorable content introduction information for the general user to thereby poll a ballot for the picture content.

When one of the polling buttons 31 to 34 is clicked, a polling information input GUI picture 40 shown in FIG. 4 is displayed. The polling information input GUI picture 40 that is used for accepting the personal information of a pollee who polls a ballot for the picture content is composed of a purchase intention input column 41 on which purchase intention to be applied when the polled picture content will be commercialized is entered, a sales offer transmission request input column 42 on which whether transmission of the sales offer is requested or not is entered, a support message input column 43 on which the support message to the picture content producer is entered, a transmission button 44 for sending the polling content, and a clear button 45 for deleting the input content on the polling information input GUI picture 40. The input that is to be entered on the purchase intention input column 41 and the sales offer transmission request input column 42 is entered by a method in which a corresponding part of the options is clicked or the e-mail address of a destination is entered, the input on the support message input column 43 is entered by a method in which a message is entered. The information entered as described hereinabove is sent to the contents market research apparatus 11 through the Internet as the contents polling information when the transmission button 44 is clicked.

Figure 5:
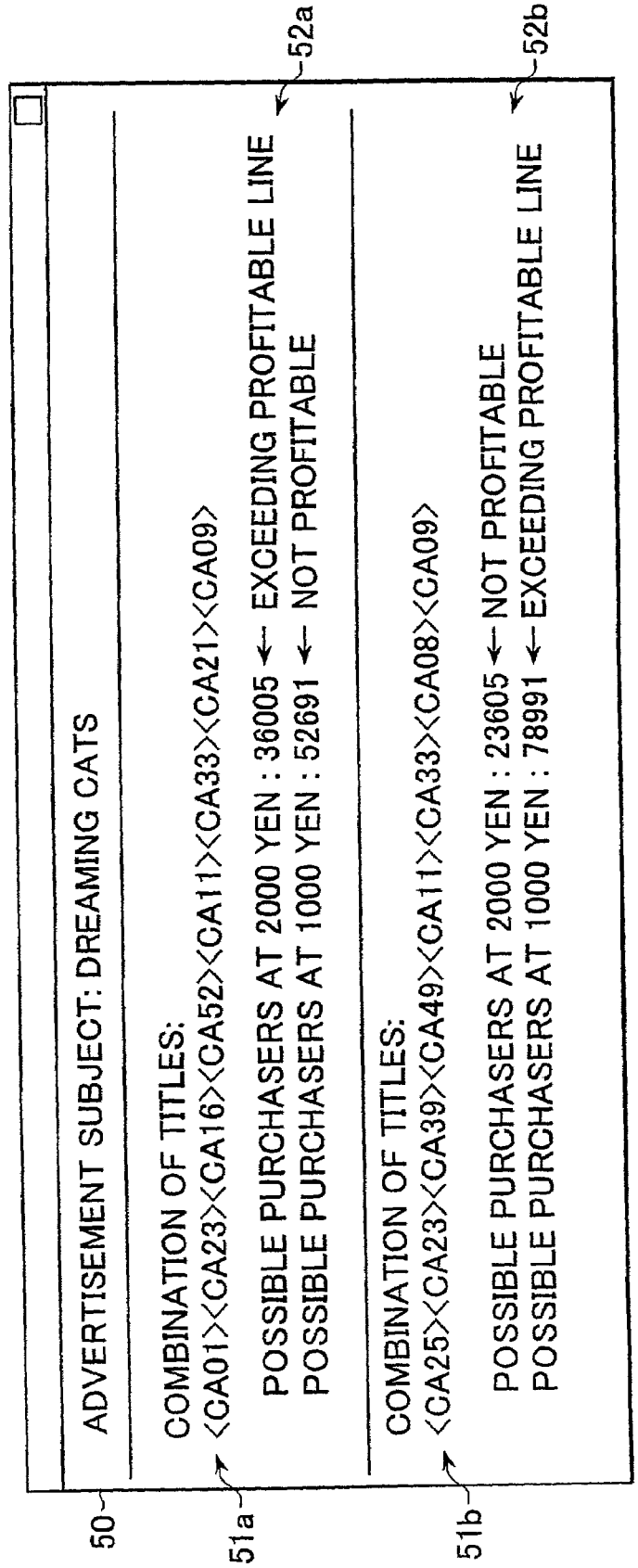
FIG. 5 is a diagram illustrating a display example of a poll result graphical user interface (GUI) picture for indicating the counted poll result.

The contents polling information sent to the contents market research apparatus II is stored in the contents polling information storage means 11d, and the contents polling information stored in the contents polling information storage means 11d is counted by means of the poll result counting means 11e and the counted result is generated as the output. FIG. 5 is a display example of a poll result display GUI picture 50 indicating the counted result generated as described hereinabove. In the case of FIG. 5, the serial number given to the picture content on content selection parts 51a and 51b is entered to thereby select a plurality of picture contents, and the selected picture contents are combined to thereby display the profitability, which will be obtained if it will be commercialized, on profitability judgment display parts 52a and 52b. In the case of this example, it is found, based on the result displayed on the profitability judgment display parts 52a and 52b, that when the picture content involving the combination of the content selection part 51a is commercialized, the picture content is profitable if the price is for example 2000 yen (approximately 20 U.S. dollars) or higher, and when the picture content involving the combination of the content selection part 51b is commercialized, the picture content is profitable if the price is 1000 yen (approximately 10 U.S. dollars) or higher.

The content producer who has viewed the counted result as described hereinabove edits the picture content referring to the result, and commercializes the content stored in a DVD. The content producer conducts the business activity such as transmission of the commercialization information to the pollee, production of the DVD, order acceptance, and sales. The content may be sold by means of the Internet broadcast.

Figure 6:
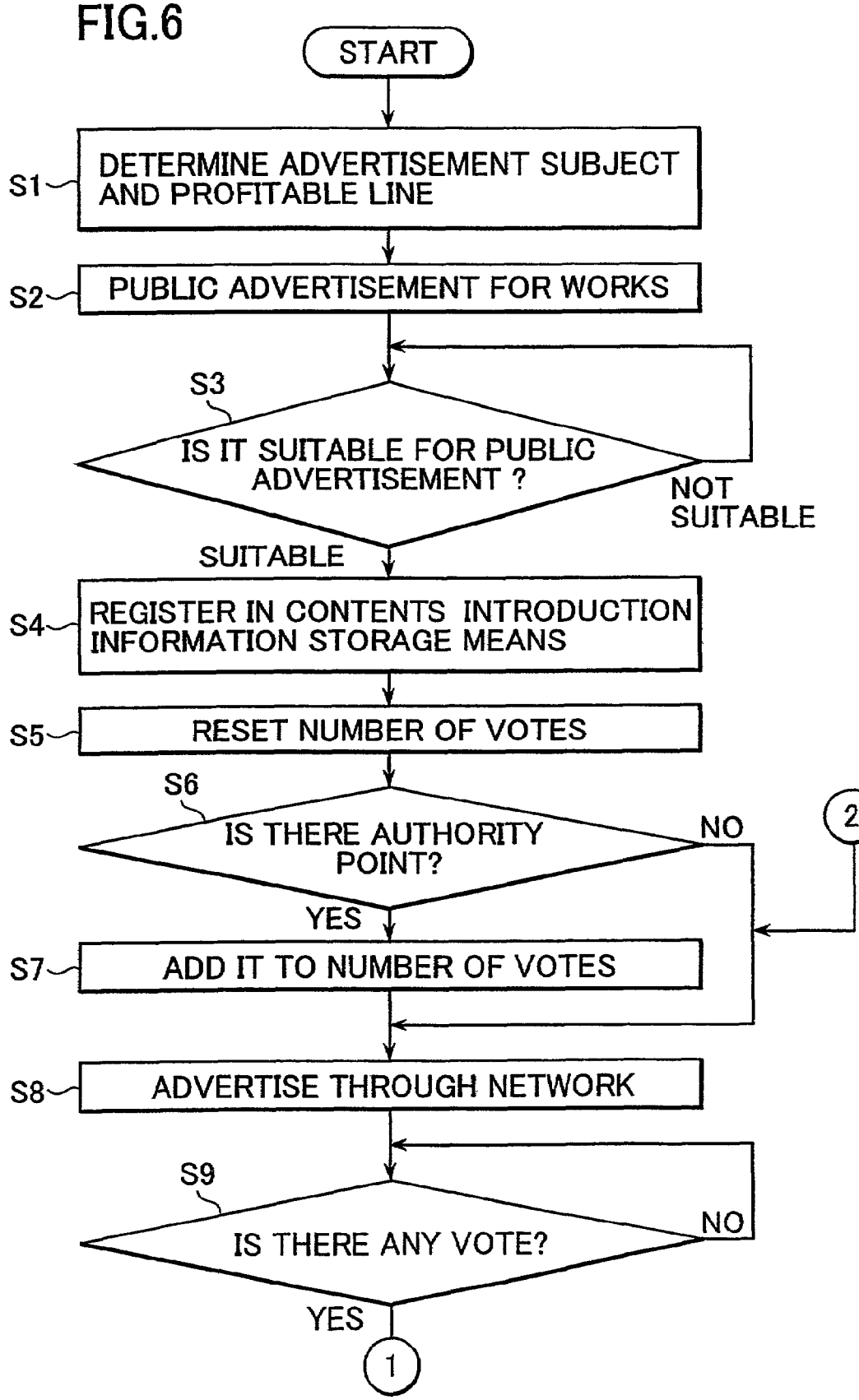
FIG. 6 is a flow chart describing a series of operations operated when the system of the present invention is used.

Next, the detailed operation of the contents market research system 10 described hereinabove will be described with reference to a flow chart. FIG. 6 and FIG. 7 are flow charts for describing a series of operations described hereinabove.

[S1] determines the advertising subject of the picture content and the profitable line.

[S2] advertises for the work from the public.

[S3] determines whether the subscribed picture content should be opened to the public or not. If the subscribed picture content is determined to be opened to the public, then the sequence proceeds to step S4. On the other hand, if the subscribed picture content is determined not to be opened to the public, then the sequence remains at step S3 and other picture contents are subjected to the same determination.

[S4] stores the picture content introduction information in the contents introduction information storage means 11a.

[S5] resets the number of ballots polled for each picture content.

[S6] determines whether the predetermined authority has polled their ballots for the predetermined picture content or not. If the polling is YES, then the sequence proceeds to step S7. If the polling is NO, then the sequence proceeds to step S8.

[S7] adds polling point of the predetermined authority to the picture content.

[S8] releases the content introduction information of each picture content to the general public on the Internet.

[S9] determines whether there is any polled ballot for the presented content introduction information. If the polling is YES, then the sequence proceeds to step S10. On the other hand, if the polling is NO, then the sequence remains at step S9.

[S10] registers the pollee information in the contents polling information storage means 11d.

[S11] adds the number of polled ballots for the polled picture content.

[S12] generates the expected sales amount corresponding to the combination of picture contents.

[S13] determines whether there is the picture content combination of high profitability exceeding the profitable line. If the result is YES, then the sequence proceeds to step S14. On the other hand, if the result is NO, then the sequence proceeds to step S8.

[S14] determines the picture content combination.

[S15] produces DVD in which the determined picture content combination is stored.

[S16] searches purchasers who want to buy the DVD based on the personal information of the pollee stored in the contents polling information storage means 11d.

[S17] conducts business activity such as production, propaganda, acceptance of order, and sales of the DVD based on the information searched in step S16.

As described hereinbefore, in the present embodiment, the content introduction information is sent to the contents polling apparatus 12, the contents polling apparatus 12 to which the content introduction information has been sent displays the sent content introduction information by means of the contents introduction information display means 12b, a pollee views the displayed content introduction information and enters the contents polling information for each picture content, the entered contents polling information is sent to the contents market research apparatus 11, and the contents market research apparatus 11 counts the sent contents polling information and generates the counted result. As the result, the picture content producing company can select the picture content that is to be commercialized and specify the detailed sales market based on the counted result, and it is possible for the picture content producing company to reduce the content selection cost, commercialize the proper picture content quickly, and reduce the cost required for researching the detailed sales market.

The above-mentioned processing function is realized by use of a computer. In this case, the processing content of the function of the contents market research apparatus and the contents polling apparatus is described in a program recorded in a computer-readable recording medium. The program is executed by means of a computer to thereby realize the above-mentioned processing by use of the computer. A magnetic recording apparatus and semiconductor memory are available as the computer-readable recording medium. In the case that the program is distributed in the market, the potable recording medium such as CD-ROM (Compact Disk Read Only Memory) or floppy disk, or the like in which the program is stored may be distributed, or the program that is stored in the memory apparatus of a computer connected to a network may be transferred to another computer through the network. When the program is executed in a computer, the program that is stored in the hard disk apparatus in the computer is loaded on the main memory for execution.

Furthermore, in the present embodiment, the popular polling for the picture content is conducted before commercialization by use of the system, but the popular polling for the picture content may be conducted after commercialization by use of the system. The result is used to estimate the additional production of the commercialized picture content and to specify the sales market.

Furthermore, in the present embodiment, the popular polling for the picture content is conducted, but the popular polling for the music or other contents may be conducted by use of the system.

As described hereinabove, in the present invention, the content introduction information is sent to the contents polling apparatus, a pollee enters the contents polling information for each content based on the sent content introduction information, the contents market research apparatus counts the entered contents polling information and generates the counted result. As the result, it is possible to reduce the content selection cost.

Furthermore, the content introduction information is sent to the contents polling apparatus, a pollee enters the contents polling information for each picture content based on the sent content introduction information, the contents market research apparatus counts the entered contents polling information and generates the counted result. As the result, it is possible to commercialize the proper picture content quickly.

Furthermore, because the contents polling information is used, it is possible to specify the detailed sales market for the picture content, and to reduce the cost required to research the detailed sales market.

What is claimed is:

1. A contents market research system for researching marketability of a picture content based on contents polling information given by a pollee and displaying the result, the system comprising:

a contents market research apparatus comprising:

contents introduction information storage means for storing content introduction information for introducing said picture content to said pollee;

contents introduction information sending means for sending said content introduction information stored in said contents introduction information storage means;

contents polling information receiving means for receiving the contents polling information that includes said polling information for said picture content;

contents polling information storage means for storing said contents polling information received by means of said contents polling information receiving means;

poll result counting means for discriminately counting said contents polling information entered by a predetermined pollee determined before said content introduction information is opened to a general pollee and said contents polling information entered by said general pollee; and a display for displaying business profitability when said picture content is commercialized on a display apparatus, wherein if personal information is included in the contents polling information, the personal information is counted in addition to ballots of each picture content and a marketable field of the picture content is specified based on the counted result of the personal information;

wherein advertisements are sent directly to the pollee based on the contents polling information and the personal information included in the contents polling information;

wherein said contents introduction information is classified into separate subdivisions as a function of subject matter;

wherein said contents introduction information is sent to a contents polling apparatus of said pollee who is suitable for said subject matter;

wherein a result counted by said poll result counting means indicates the most marketable picture content and said picture content is selected to be commercialized based on the result;

wherein a purchase intention on the basis of cost and a sales offer transmission request are included in the content polling information, and said contents polling apparatus comprising:

contents introduction information receiving means for receiving said content introduction information sent by means of said contents introduction information sending means;

contents introduction information display means for displaying said content introduction information;

contents polling means for entering said contents polling information; and contents polling information sending means for sending said contents polling information entered by said contents polling means.

2. The contents market research system as claimed in claim 1, wherein said content introduction information includes said picture content.

3. The contents market research system as claimed in claim 1, wherein said contents introduction information sending means sends said content introduction information that has been classified as a function of subject matter.

4. The contents market research system as claimed in claim 1, wherein said contents polling information includes personal information of said pollee.

5. The contents market research system as claimed in claim 1, wherein said contents polling information includes the merchandise purchase intention information of said pollee to be activated when said content is commercialized.

6. The contents market research system as claimed in claim 1, wherein said predetermined pollee is provided a greater quantity of ballots than said general pollee.

7. The contents market research system as claimed in claim 1, wherein said poll result counting means generates said business profitability as a function of said picture content.

8. The contents market research system as claimed in claim 1, wherein said contents polling information includes the information indicating whether said pollee wants sales advertisement of merchandise.

9. A contents market research apparatus for researching the marketability of a picture content before commercialization based on contents polling information given by a pollee comprising:

contents introduction information storage means that stores the content introduction information for introducing said picture content to said pollee;

contents introduction information sending means for sending said content introduction information stored in said contents introduction information storage means;

contents polling information receiving means for receiving the contents polling information that includes said polling information for said picture content;

contents polling information storage means for storing said contents polling information received by said contents polling information receiving means;

poll result counting means for discriminately counting said contents polling information stored in said contents polling information storage means between said contents polling information entered by one or more predetermined pollees determined before said content introduction information is opened to one or more general pollees and said contents polling information entered by said general pollees and for displaying the business profitability to be obtained when said content is commercialized, wherein if personal information is included in the contents polling information, the personal information is counted in addition to ballots of each picture content and a marketable field of the picture content is specified based on the counted result of the personal information, wherein advertisements are sent directly to the pollee based on the contents polling information and the personal information included in the contents polling information;

wherein said contents introduction information is classified into separate subdivisions as a function of subject matter;

wherein said contents introduction information is sent to a contents polling apparatus of said pollee who is suitable for said subject matter;

wherein a result counted by said poll result counting means indicates the most marketable picture content and said picture content is selected to be commercialized based on the result; and wherein a purchase intention on the basis of cost and a sales offer transmission request are included in the content polling information.

10. A contents market research method used for researching the marketability of a picture content before commercialization based on contents polling information given by one or more pollees, the method comprising:

introducing said picture content to said one or more pollees;

storing the picture content introduced to said one or more pollees;

sending said stored picture content introduced to said one or more pollees;

receiving contents polling information from said one or more pollees;

storing said received contents polling information;

discriminately counting, by a computer, said stored contents polling information as a function of contents polling information entered by one or more predetermined pollees determined before said content introduction information is opened to one or more general pollees and said contents polling information entered by said general pollees; and determining, by a computer, a business profitability to be obtained when said content is commercialized, wherein said picture content is submitted by a viewer after viewing an advertisement for a subject of said picture content, wherein if personal information is included in the contents polling information, the personal information is counted in addition to ballots of each picture content and a marketable field of the picture content is specified based on the counted result of the personal information, wherein advertisements are sent directly to the pollee based on the contents polling information and the personal information included in the contents polling information;

wherein said contents introduction information is classified into separate subdivisions as a function of subject matter;

wherein said contents introduction information is sent to a contents polling apparatus of said pollee who is suitable for said subject matter;

wherein a result counted by said counting step indicates the most marketable picture content and said picture content is selected to be commercialized based on the result; and wherein a purchase intention on the basis of cost and a sales offer transmission request are included in the content polling information.

11. A program, stored on a computer-readable medium researching marketability of a picture content before commercialization based on contents polling information, the program comprising the steps of:

introducing said picture content to one or more pollees;

storing said picture content introduced to said one or more pollees;

sending said stored picture content to the one or more pollees;

receiving contents polling information related to said content, from said one or more pollees;

storing said received contents polling information;

discriminately counting said stored contents polling information entered by one or more predetermined said pollees determined before said content introduction information is opened to one or more general pollees and said contents polling information entered by said general pollees; and determining business profitability to be obtained when said picture content is commercialized, wherein if personal information is included in the contents polling information, the personal information is counted in addition to ballots of each picture content and a marketable field of the picture content is specified based on the counted result of the personal information, wherein advertisements are sent directly to the pollee based on the contents polling information and the personal information included in the contents polling information;

wherein said contents introduction information is classified into separate subdivisions as a function of subject matter;

wherein said contents introduction information is sent to a contents polling apparatus of said pollee who is suitable for said subject matter;

wherein a result counted by said counting step indicates the most marketable picture content and said picture content is selected to be commercialized based on the result; and wherein a purchase intention on the basis of cost and a sales offer transmission request are included in the content polling information.

* * * * *